United States Patent [19]

Brennan et al.

[11] 4,099,607

[45] Jul. 11, 1978

[54] APERTURE MASK CONVEYOR AND INSPECTION SYSTEM

[75] Inventors: Leon E. Brennan; Joseph P. Lagermasini, both of Towanda; Larry L. Rarig, Lancaster, all of Pa.

[73] Assignee: GTE Sylvania Incorporated, Stamford, Conn.

[21] Appl. No.: 765,772

[22] Filed: Feb. 4, 1977

[51] Int. Cl.² ...................... B65G 43/08; B65G 21/10; B65G 15/14

[52] U.S. Cl. .................................. 198/341; 193/2 C; 198/470; 198/524; 198/560; 198/586; 198/627; 198/862; 271/184; 271/185

[58] Field of Search ............... 198/339, 341, 406, 407, 198/469, 470, 560, 627, 422, 502, 523, 524, 857, 586, 594, 312, 862, 562; 271/184, 185; 250/562, 563, 572; 209/73, DIG. 1; 193/25 R, 25 A, 25 E, 25 C, 2 R, 2 C

[56] References Cited

U.S. PATENT DOCUMENTS

| | | | |
|---|---|---|---|
| 1,288,125 | 12/1918 | Müller | 193/2 C X |
| 1,826,379 | 10/1931 | Birkmeyer et al. | 198/560 X |
| 2,758,728 | 8/1956 | Henry | 198/470 X |
| 3,242,342 | 3/1966 | Gabar | 198/502 X |
| 3,360,099 | 12/1967 | Barr | 198/470 |
| 3,554,351 | 1/1971 | Rothenbach et al. | 198/857 X |
| 3,618,740 | 11/1971 | Taverna | 198/339 |
| 3,928,114 | 12/1975 | Aylon | 198/586 X |
| 3,952,874 | 4/1976 | Owen | 209/DIG. 1 X |
| 4,029,194 | 6/1977 | Feurstein et al. | 198/862 X |

*Primary Examiner*—Evon C. Blunk
*Assistant Examiner*—James L. Rowland
*Attorney, Agent, or Firm*—John C. Fox

[57] ABSTRACT

The aperture mask conveyor and inspection system comprises a pair of belt conveyor assemblies which between them grip and transport an aperture mask from the end of the processing unit to a chute assembly which chute assembly feeds the mask onto a belt conveyor, a densitometer is centrally positioned on the belt conveyor to provide a measure of the amount of light transmitted through the center portion of the mask which is passed beneath the densitometer. After passing under the densitometer the mask is deposited on an adjacent tray.

12 Claims, 12 Drawing Figures

F/G. 1.

APERTURE MASK CONVEYOR AND INSPECTION SYSTEM

BACKGROUND OF THE INVENTION

In the manufacture of aperture masks the product starts as a roll of 0.007 inch steel of suitable type and undergoes a series of photographic and chemical process steps to produce apertures of the required size and spacing. The last step is to separate the masks from the web which is done with the web in a vertical position. The masks are discharged through a set of pinch rolls with the major axis vertical. The masks are then directed down a chute where they are collected and transported to an inspection area. At prescribed intervals a mask is checked for the amount of light transmitted through the center portion of the mask. If this check indicates a defective mask than all of the masks made since the last passing inspection must be tested. This backlog of masks could be considerable since the masks are made at the rate of about ten per minute. In addition to the inspection load, the process must be changed to prevent further production of defective masks.

In view of the foregoing it is an object of this invention to provide an aperture mask conveyor and inspection system that will be quickly responsive to process variations and thereby greatly cut down on the production of defective masks.

It is another object of this invention to provide a system as set forth in the previous object which is substantially automated.

It is yet another object of this invention to provide a mask conveyor and inspection system which will check every mask in order of production and provide a continuous record of such checks to make it possible to indicate process changes before defects are produced by noting trends in the test results.

The above and additional objects and advantages will become more apparent when taken in conjunction with the following detailed description and drawings.

IN THE DRAWINGS

FIG. 1 is a perspective view of the aperture mask conveyor and inspection system of this invention, FIG. 2 is a top plan view of the parallel belt conveyor assemblies between which the aperture mask is fed from the mask processing apparatus, FIG. 3 is a side elevational view of the parallel belt conveyor assemblies showing the movable conveyor assembly spaced from the fixed conveyor assembly, FIG. 4 is an elevational view partly in section and taken from the rear of the chute assembly illustrating the means for moving the outer portions of the chute to vary the width thereof, FIG. 5 is a top plan view of the conveyor assembly which mounts the test equipment, FIG. 6 is a side elevational view of the conveyor assembly of FIG. 5, FIG. 7 is a top plan view of the carriage assembly which supports the conveyor system of FIG. 5 and the chute assembly of FIG. 4, FIG. 8 is a side elevational view of the carriage assembly of FIG. 7, FIG. 9 is an end elevational view of the carriage assembly illustrating the two degrees of adjustability of the assembly, FIG. 10 is an enlarged view partly in section of the means for transversely moving the carriage assembly, FIG. 11 is a top plan view of the parallel belt conveyor assemblies, and FIG. 12 is an elevational view of the parallel belt conveyor assemblies.

DETAILED DESCRIPTION

Figure 1:
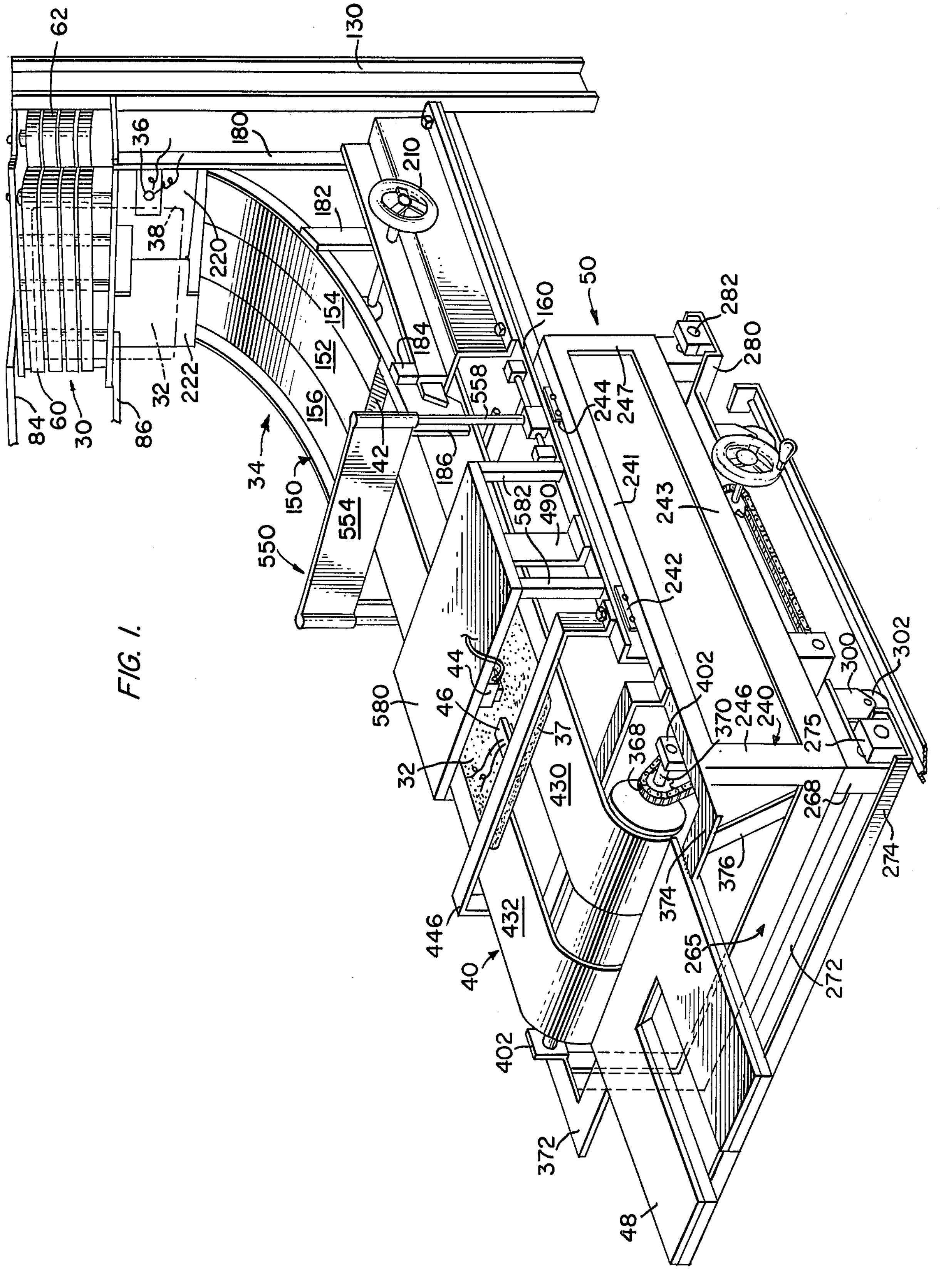
Figure 2:
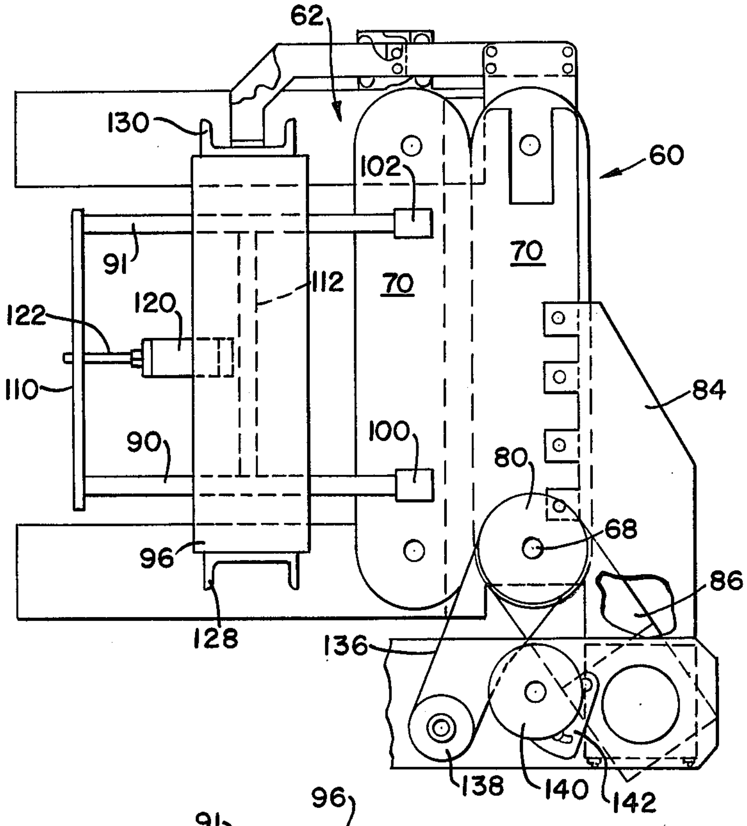
Figure 3:
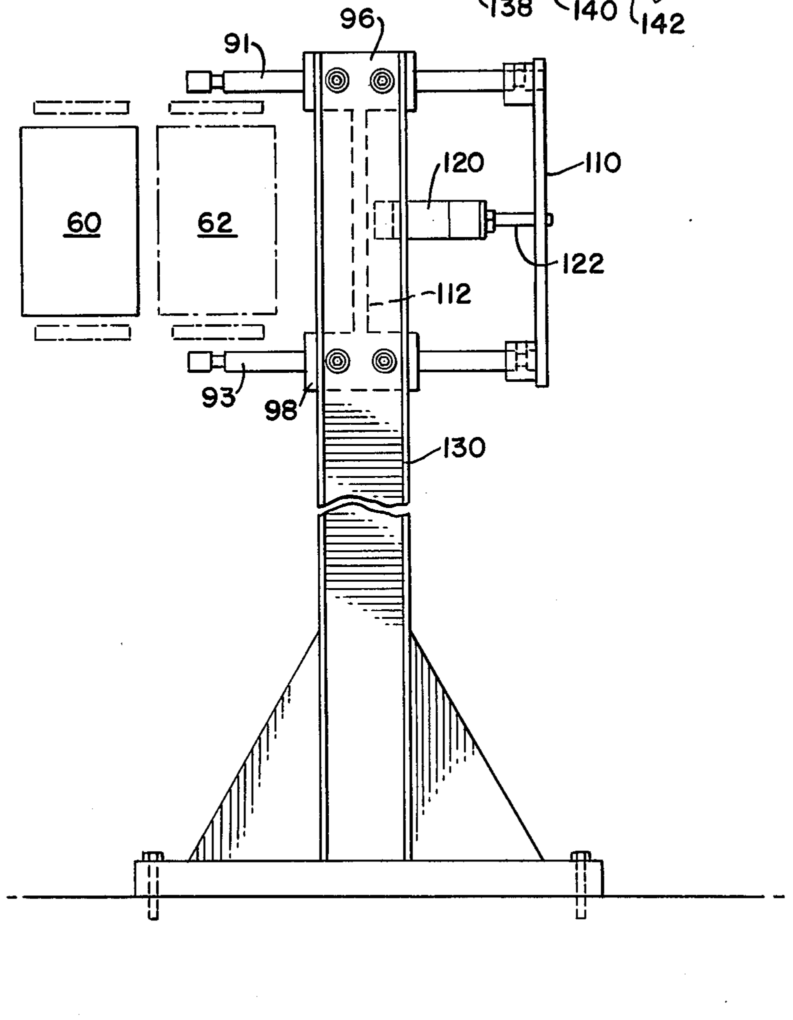

A perspective view of the entire aperture mask conveyor and inspection system is found in FIG. 1 of the drawings. As illustrated the system comprises a first conveyor assembly 30 for transporting an aperture mask 32, shown in dotted lines, in a vertical attitude from the mask processing apparatus, which if shown would be to the left of the first conveyor assembly 30, into alignment with chute assembly 34. A photoelectric sensing unit 36 detects the leading vertical edge 38 of the mask 32 to determine when the mask is aligned with the chute to actuate means, to be described later, to release the aperture mask 32 so that it will fall upon the chute assembly 34. A second conveyor means 40 is horizontally disposed with one end under the lower end 42 of the chute assembly 34 so that the aperture mask 32 may travel from the chute assembly 34 downwardly onto the second conveyor means 40.

The second conveyor means 40 transports the aperture mask 32 under densitometer 44 and then photoelectric sensing assembly 46. After which the aperture mask is deposited on tray 48. The chute assembly 34 and second conveyor means 40 are mounted on carriage assembly 50 which assembly provides fore and aft as well as lateral movement so that the chute assembly 34 and the second conveyor means 40 may be aligned with the first conveyor means 30 which is independently mounted for cooperative association with the aperture mask processing apparatus which is not shown in the drawings since it forms no part of this invention.

Referring to the mask conveyor and inspection system in detail, the first conveyor means 30 as best illustrated in FIGS. 1-3, 11 and 12 comprises a pair of parallel belt conveyor units 60 and 62. Each belt conveyor unit includes a plurality of belts 64 carried on pulleys 66 mounted on shafts 68 supported by upper plate 70 and lower plate 72. The upper plate 70 and the lower plate 72 are held in spaced position by means of through support rods 74. Power to rotate the pulleys 66 on the fixed conveyor unit 60 is provided through power input pulley 80 which is connected to the shaft 68. The fixed conveyor unit 60 is held in position by means of upper bracket 84 secured to upper plate 70 and lower bracket 86 affixed to lower plate 72.

Figure 11:
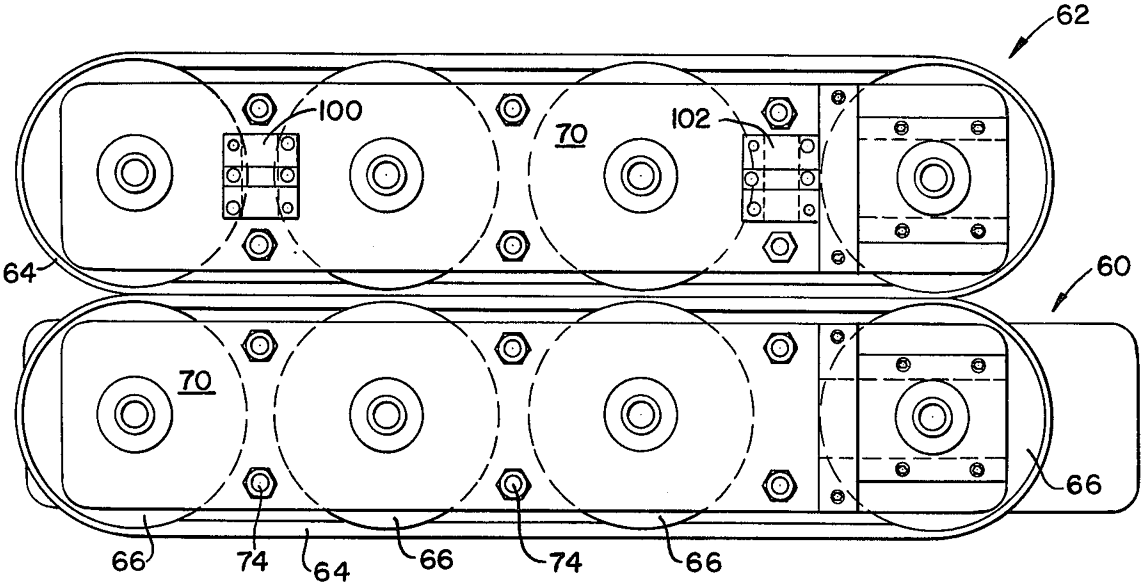
Figure 12:
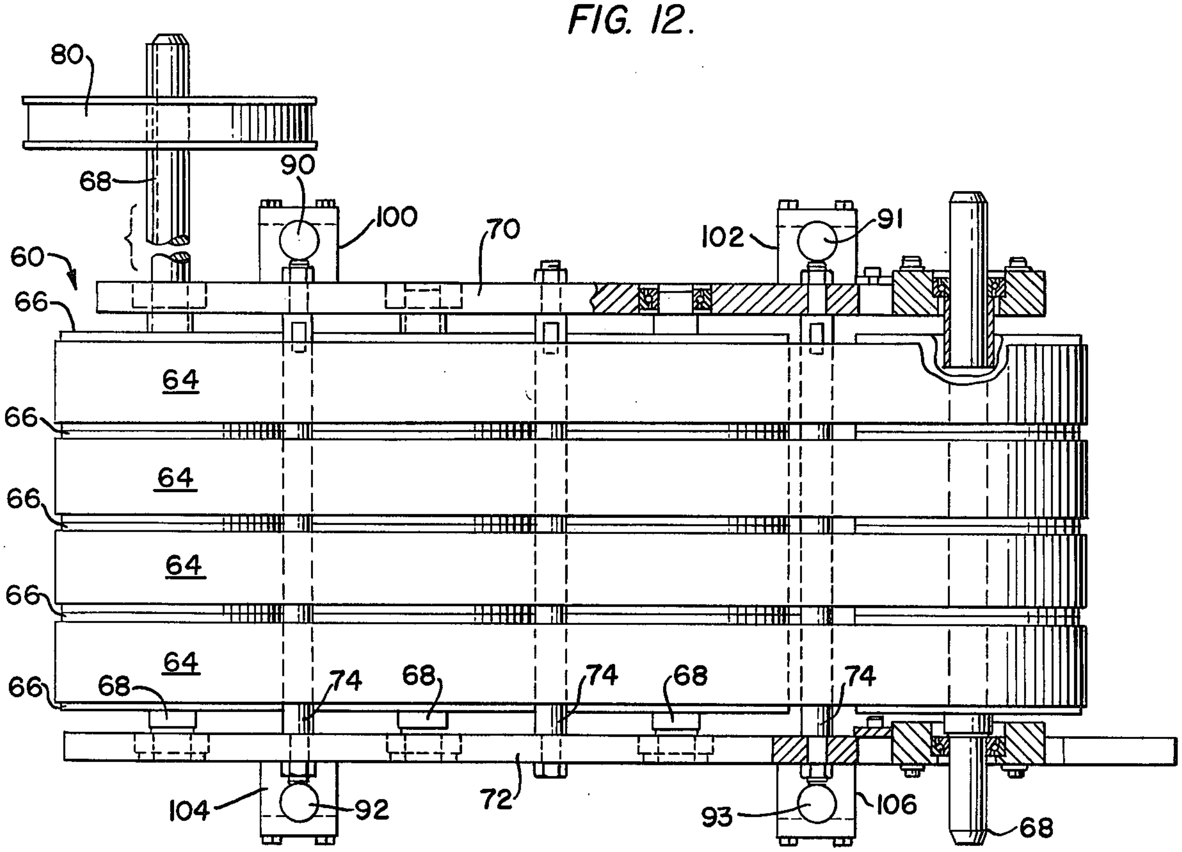

The movable conveyor unit 62 is supported by means of four rods 90, 91, 92 and 93 with rods 90 and 91 slidably mounted in upper support bar 96 and rods 92 and 93 similarly mounted in lower support bar 98. Rod 92 is directly beneath rod 90 and is not shown in FIGS. 2 and 3. Reference should be made to FIGS. 11 and 12 wherein mounting blocks 100, 102, 104 and 106 secure the ends of rods 90, 91, 92 and 93 respectively to the respective upper and lower plates 70 and 72. The other ends of rods 90-93 are affixed to square mounting plate 110. A vertical plate 112 extends between upper and lower mounting bars 96 and 98 to centrally carry double acting air cylinder unit 120 having a reciprocating rod 122 centrally secured to square mounting plate 110. Vertical channels 128 and 130 mount supporting bars 96 and 98, said channels in turn being appropriately affixed to the area floor or other suitable base.

Power is furnished to input power pulley 80 by means of belt 136 which is operatively connected to pulley 80 and pulley 138 which pulley is suitably powered by conventional means. Idler pulley 140 bears against the belt 136 to maintain required tension, such pulley being adjustable by virtue of its mounting on pivoting bracket 142.

Figure 4:
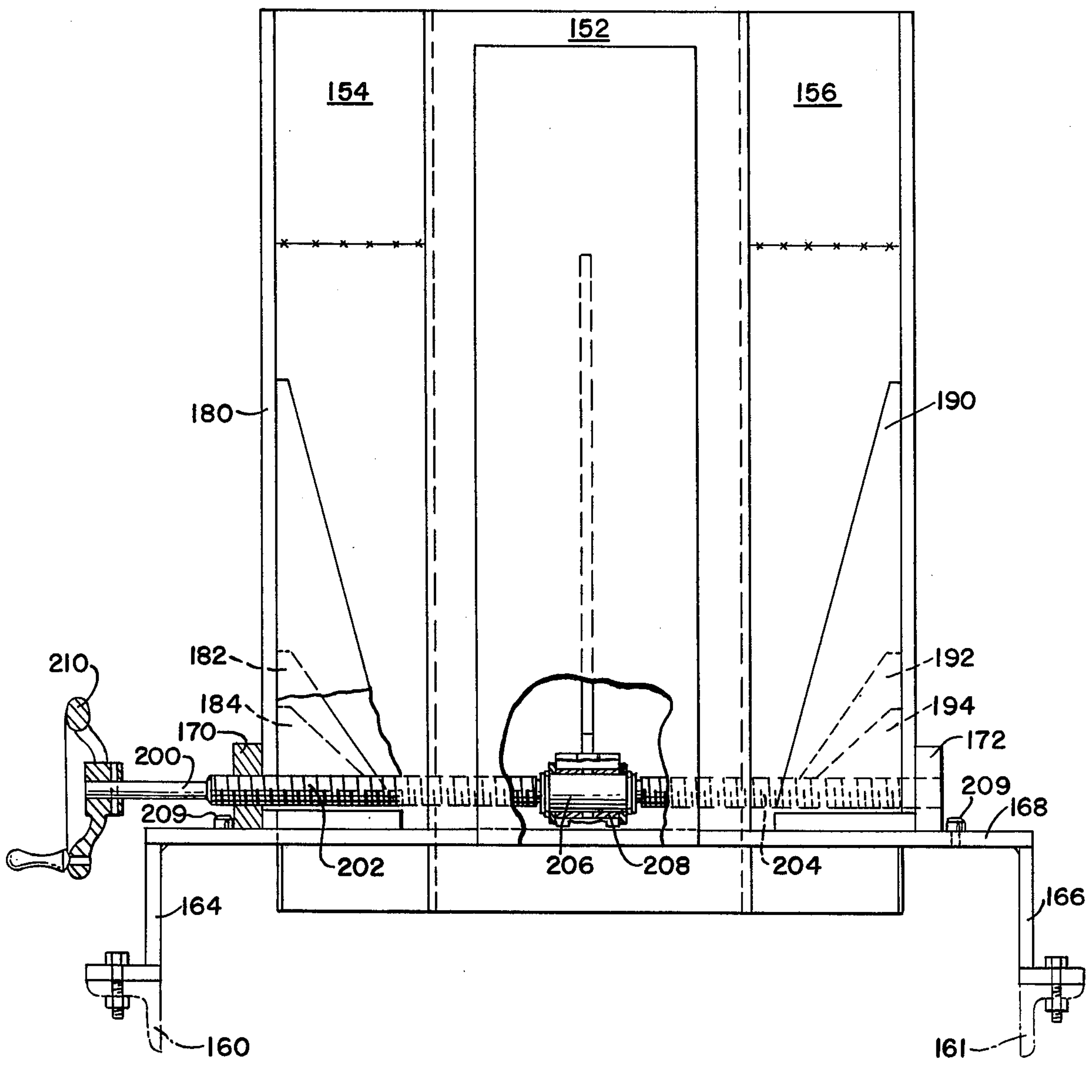

The chute assembly 34 is best shown in FIGS. 1 and 4 and comprises a chute 150 including three curved chute elements, the center element 152 being fixed while the outer chute elements 154 and 156 are slidable inwardly and outwardly with respect to the center element 152 to vary the width of the chute 150. Longitudinal angle irons 160 and 161 support angle brackets 164 and 166 which in turn mount horizontal base member 168. Longitudinally extending bars 170 and 172 are slidably positioned on base 168. Outer chute element 154 is held in position and is connected to longitudinal bar 170 by means of vertical brackets 180, 182 and 184. A guide member 186 is connected to and extends forwardly from the bar 170 to assist in guiding the mask as it leaves the chute 150 and descends onto the conveyor system 40 directly therebeneath. A similar guide member (not shown) is provided for bar 172. Similarly chute element 156 is connected to and is held in position by vertical brackets 190, 192 and 194.

In order to move the chute elements 154 and 156 toward and away from the fixed chute element 152, a shaft 200 is formed with oppositely threaded portions 202 and 204 extending outwardly from the shaft center portion 206 which is rotatable within bushing 208 fixed to stationary chute element 152. Shaft 200 is held against longitudinal movement by the bushing 208 so that when the shaft 200 is rotated the oppositely threaded portions 202 and 204 which are threaded carried by longitudinal bars 170 and 172 respectively will cause the chute elements 154 and 156 to move toward or away from the center fixed chute element 152. Stop elements 209 are provided to limit outward movement of the chute elements 154 and 156. A wheel 210 is affixed to the free end of shaft 200 for use in rotating same. Mask guide plate 220 is affixed to vertical bracket 180 and together with similarly mounted mask guide plate 222 serve to guide the mask 32 while under conveyor feed and the subsequent descent onto chute 150. Guide plates 220 and 222 move with the outer chute elements 154 and 156.

As shown in FIG. 1 the longitudinal angle iron 160, which together with parallel longitudinal angle iron 161 supports the chute assembly 34, is connected to the upper longitudinal side frame member 241 of the carriage assembly 50 by means of brackets 242 and 244. The longitudinal angle iron 161 is similarly connected to the other upper side frame member of the carriage assembly 50. As best shown in FIGS. 1, 7, 8, 9 and 10 the carriage assembly 50 comprises rectangular parallel side frame assemblies 240 and 250. Side frame assembly 240 includes upper longitudinal frame member 241 and lower longitudinal side frame member 243 connected by end frame members 246 and 247. Side frame assembly 250 is exactly like frame assembly 240. These two side frame assemblies 240 and 250 are connected at one end by upper and lower cross members 260 and 261 and at the other end by upper and lower cross members 264 and 265, thus forming a rigid upper carriage frame 269. Bearing blocks 268 and 270 are mounted on the lower corners of one end of the upper carriage frame 269 and mount a cross rod support 272 which in turn is also held in fixed position on U-shaped channel 274 by rod supports 275, 276, 277 and 278 all secured to said channel 274. The other end of the upper carriage frame 269 is similarly supported by U-shaped channel 280 and rod 282, thus the upper carriage frame 269 is slidable on rods 272 and 282 relative to U-shaped channels 274 and 280 which are held in fixed position by means of inner longitudinal channels 290 and 292. Outer channels 294 and 296 also extend between and connect U-shaped channels 274 and 280. Thus longitudinal channels 290, 292, 294 and 296 are connected to transverse U-shaped channels 274 and 280 to form a lower carriage frame 298. Wheel assemblies 300 are mounted on the lower side of the lower carriage frame 298 with their wheels 302 riding on longitudinal rails 304 to provide fore and aft movement of the carriage assembly 50 and all apparatus carried thereby.

Figure 10:
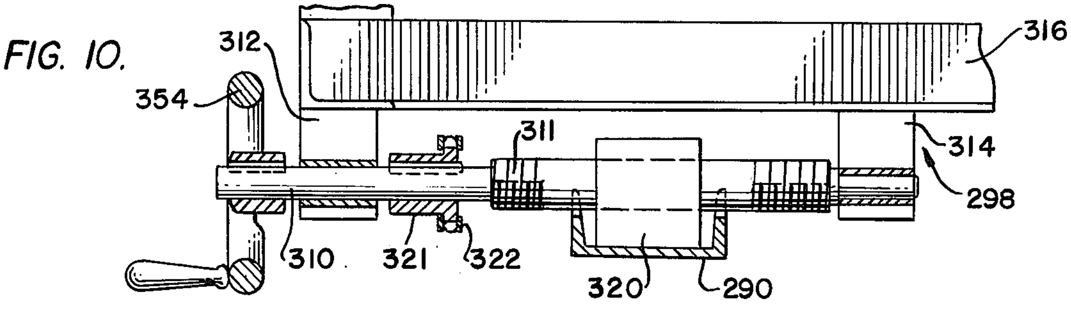

The upper carriage frame 269 is transversely slidable relative to the lower carriage frame 298 on transverse rods 272 and 282 in the following manner. As best illustrated in FIG. 10, shaft 310 is rotatably supported by brackets 312 and 314 affixed to cross frame member 316 on the upper carriage frame 269. An internally threaded block 320 is secured to channel 290 and the lower carriage frame 298 and threadedly receives threaded portion 311 of shaft 310. A sprocket 321 is fixedly mounted on shaft 310 to operatively engage sprocket chain 322. A second shaft 330 parallel to shaft 310 is rotatably mounted by means of brackets 342 affixed to plate 344 extending between channel 264 and cross frame member 346. An internally threaded bearing block 348 is mounted on channel 290 which is secured to the lower carriage frame 298 and threadedly receives threaded portion 331 of shaft 330. A sprocket 352 is mounted on shaft 330 and is engaged by sprocket chain 322. Handwheel 354 is mounted on the outer end of shaft 310 to provide manual means for rotating shaft 310 and shaft 330 connected thereto by chain 322. Rotation of the shaft 310 and associated shaft 330 will produce relative movement between the upper carriage frame 269 and the lower carriage frame 298.

A motor 360 is mounted on plate 344 and through chain 362 transfers rotative power to speed reducer 364 whose output is connected to chain 336 connected to sprocket 368 on pulley shaft 370. A U-shaped tray 48 is secured to upper carriage frame 269 by means of brackets 372 and 374 and angular supports 376.

Figure 5:
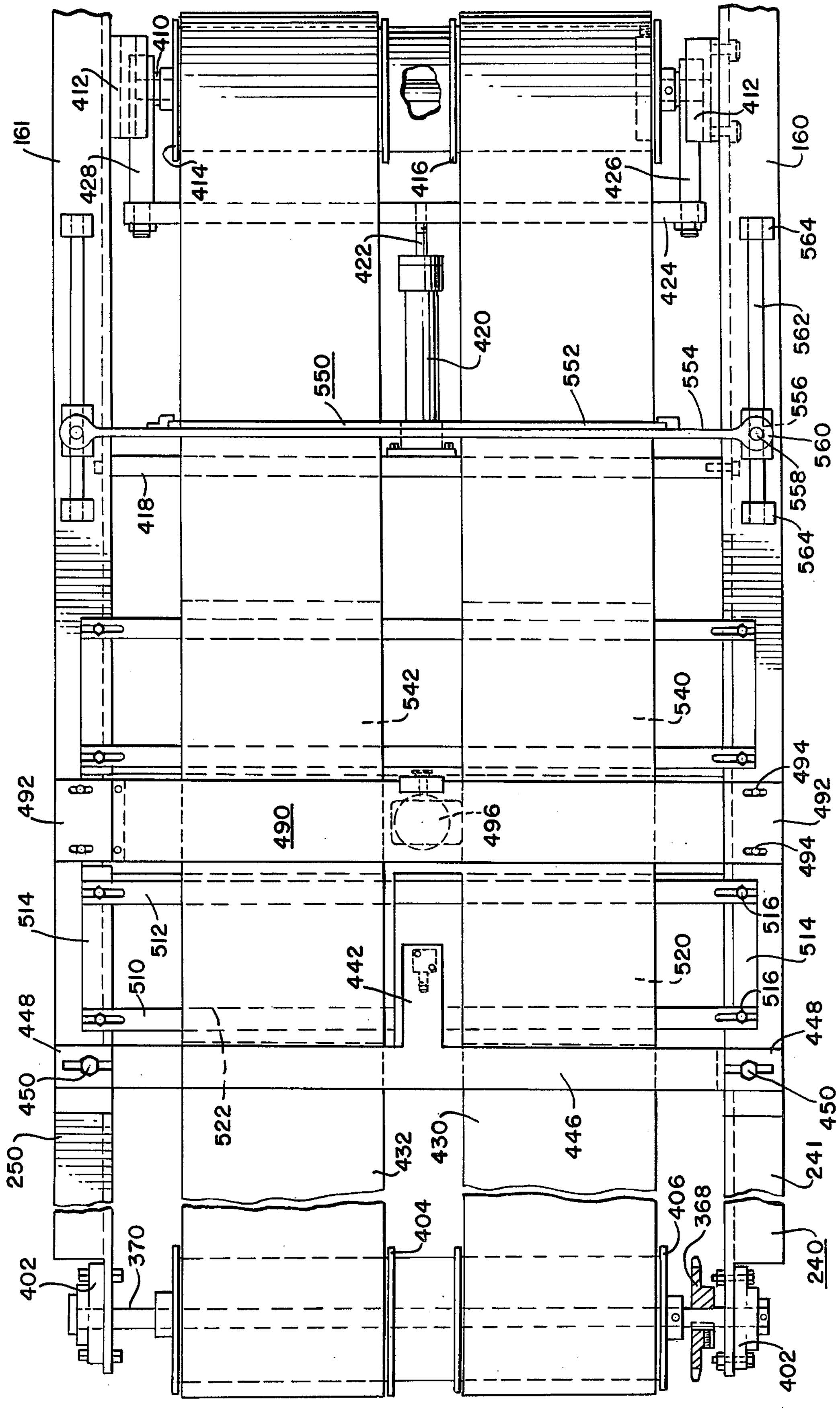
Figure 6:
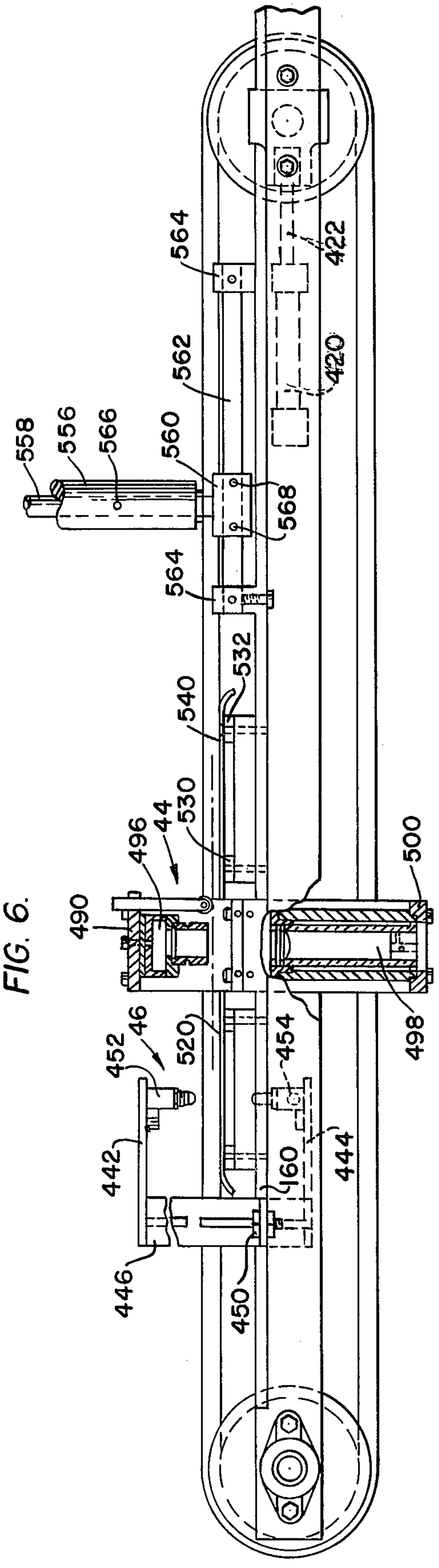
Figure 8:
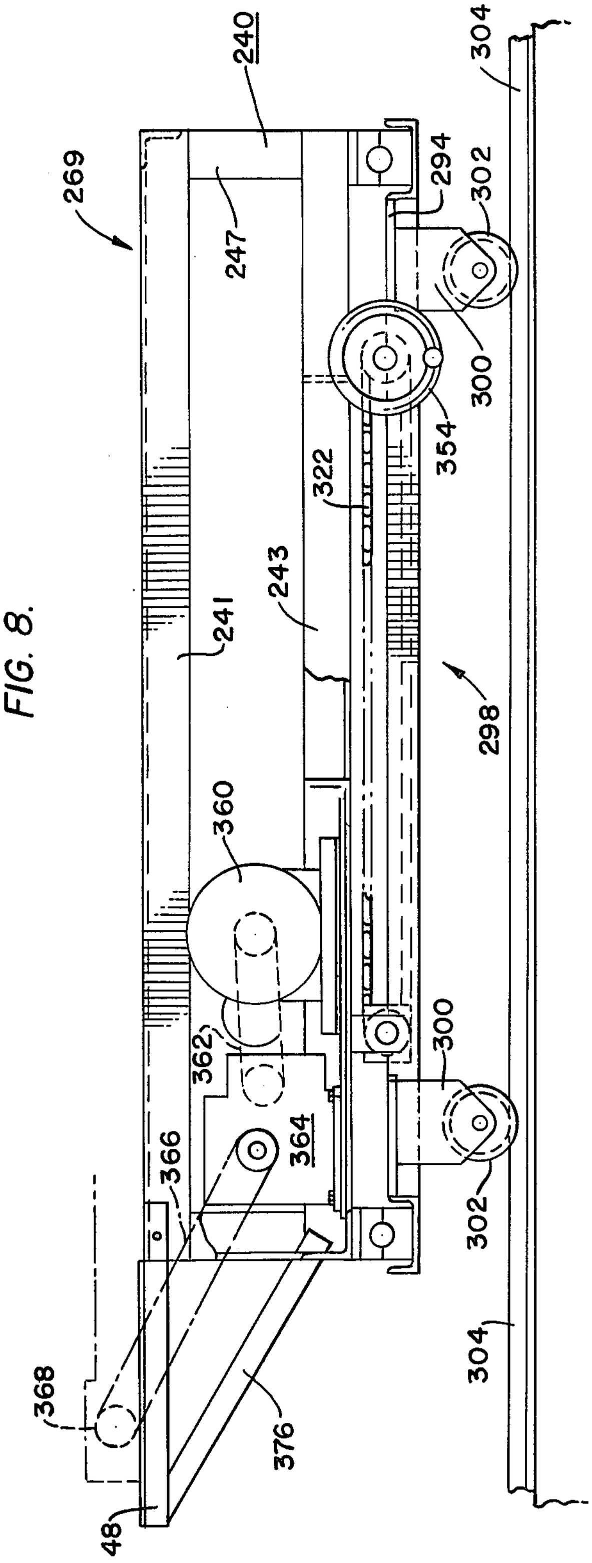
Figure 7:
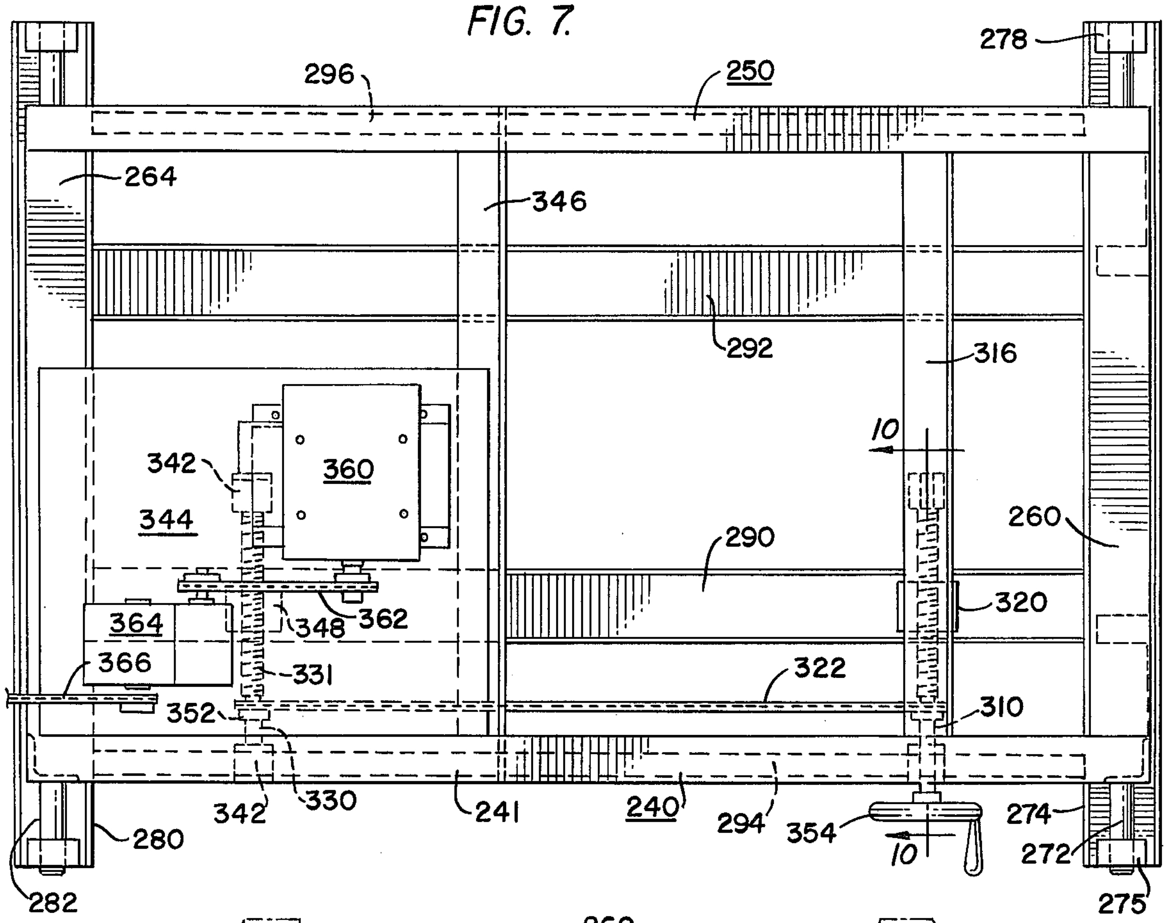
Figure 9:
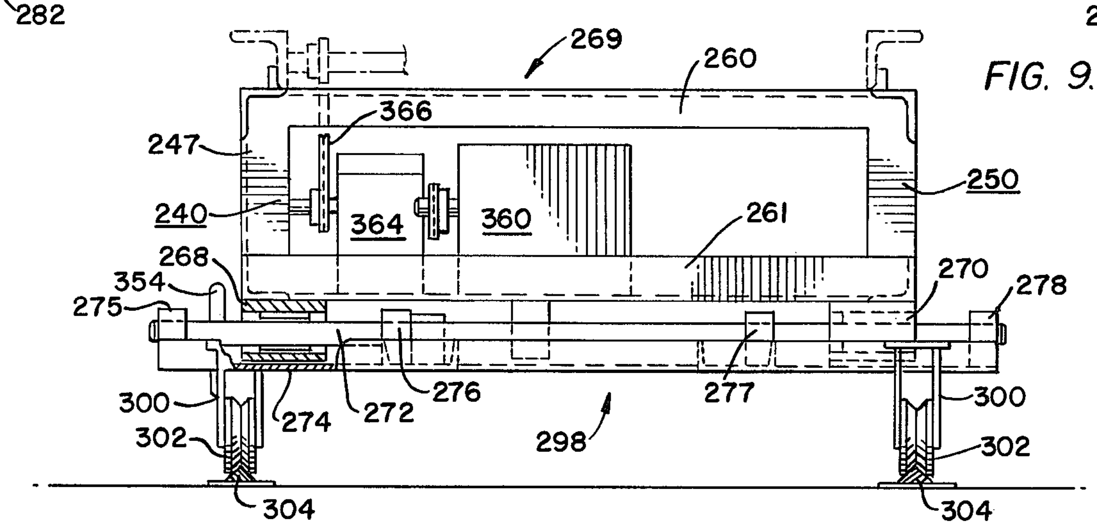

The horizontal dual belt assembly 40 is mounted on the carriage assembly 50 and is shown in detail in FIGS. 5 and 6. Pulley shaft 370 is mounted between carriage side frames 240 and 250 by means of bearings 402 and has pulleys 404 and 406 secured thereon. Adjustable pulley shaft 410 is rotatably and longitudinally slidably mounted in bearings 412 secured to longitudinal angle irons 160 and 161 which in turn are mounted on the upper carriage 269. Shaft 410 mounts pulleys 414 and 416. Cross brace 418 mounted between angle irons 160 and 161 supports single acting air cylinder assembly 420 having a piston rod 422 rigidly connected to pusher bar 424 which in turn mounts pressure rods 426 and 428 operatively connected to the end portions of shaft 410 to longitudinally apply pressure to the pulleys 414 and 416 to develop the prescribed belt tension. Belt 430 rides on pulleys 406 and 416 while belt 432 rides on pulleys 404 and 414. It should be noted that the pulleys are so disposed on their respective shafts that a space is medially developed between the belts for purposes to be described later on.

A photoelectric sensing assembly 46 is supported by parallel and spaced arms 442 and 444 extending from cross bracket 446 connected to angle irons 160 and 161 by way of slotted portions 448 secured to the angle irons by nut and bolt units 450. More particularly, light source 452 is mounted on arm 442 directing light downwardly between the belts 430 and 432 onto light detector 454 mounted therebeneath on arm 444. The slotted portions 448 on cross bracket 446 make possible small lateral adjustment of the photoelectric sensing assembly 46.

A densitometer assembly 44 is positioned ahead of the photoelectric sensing assembly 46 and in longitudinal alignment therewith so that the densitometer will scan the mid portion of the mask positioned thereunder. More specifically, cross plate 490 is mounted between angle irons 160 and 161 so as to be laterally adjustable by virtue of slotted end portions 492 which are secured to the angle irons 160 and 161 by conventional nut and bolt units 494. Phototube 496 is centrally positioned on cross plate 490 to receive light as it passes through apertures in a mask from light source 498 supported by cross plate 500 connected between angle iron 160 and 161 in the same manner as cross plate 490.

Referring again to FIGS. 5 and 6, cross bars 510 and 512 have slotted ends resting on longitudinal spacers 514 secured to angle irons 160 and 161. Screws 516 secure the cross bars 510 and 512 to spacers 514 in transversely adjustable manner. Cross bars 510 and 512 mount belt support plates 520 and 522 sized to generally conform to the width of belts 430 and 432. Cross bars 530 and 532 are mounted between the angle irons 160 and 161 in the same manner as cross bars 510 and 512 and mount belt support plates 540 and 542.

A mask bumper assembly 550 is adjustably mounted on angle irons 160 and 161. More specifically, the bumper assembly includes a resilient shock absorbing member 552 mounted on rectangular cross support 554 whose ends are affixed to vertical tubes 556 vertically slidable on upstanding rods 558 having their bottom ends secured to a horizontally disposed hollow bushing 560 slidably mounted on longitudinal rods 562 mounted fore and aft by blocks 564. The blocks 564 are secured to angle iron 160 on one side and angle iron 161 on the other. A set screw 566 is threadedly mounted in each tube 556 to bear against rod 558 to set vertical height while set screws 568 are threadedly carried in each bushing 560 to set longitudinal positioning of the bumper.

A table 580 is mounted on the carriage by means of upright supports 582 which position the table over and above the belts 430 and 432 as well as the densitometer 44 and cross plate 490 on which it is mounted.

In use, an aperture mask 32 is fed from the processing unit to conveyor assembly 30 where the mask 32 is gripped between belt conveyor units 60 and 62 and is fed in the direction of its minor axis until the mask is aligned with chute 150. Proper positioning is sensed by photoelectric sensor 36 which detects the arrival of mask lead edge 38 at the prescribed point and through conventional controls, not shown, actuates air cylinder 120 to move conveyor unit 62 away from conveyor unit 60 and allow the mask carried therebetween to drop down onto chute 150. As previously described, the outer chute elements 154 and 156 are adjustable inwardly and outwardly with respect to the center fixed chute element 152 to accommodate masks of various sizes. Rotation of wheel 210 carries oppositely threaded shaft portions 202 and 204 to move the chute elements 154 and 156.

The aperture mask 32 slides down chute 150 in the direction of its major axis and is deposited on parallel conveyor belts 430 and 432. When the mask is deposited on the conveyor belts 430 and 432 it has been aligned by the chute 150 such that its major axis will pass directly beneath the densitometer 44 which is triggered by the leading edge 37 of the mask 32 being detected by photocell unit 46. The photocell unit 46 is mounted such that the space between it and the densitometer 44 is one-half the length of the mask. Upon triggering of the densitometer 44 signals are sent to any type of desired equipment to provide indications as to whether or not the mask meets required aperture specifications. In this connection reference is made to U.S. Pat. No. 3,744,905 to Smith relating to apparatus for measuring and marking aperture masks. This patent discloses light detection means which receive light passing through the mask apertures and the conversion of such to electrical signals for comparison purposes to determine whether or not aperture size is being maintained within presented limits. Means are also provided for display and printing of test results. By continuously checking the same area, generally center area, of a mask for aperture size and recording such results, it is possible to detect process trends and adjust process variables before defective masks are produced. Reference is also made to U.S. Pat. No. 3,906,239 to Smith et al relating to light measuring apparatus for apertured material.

After the mask passes under the photocell unit 44 it is deposited on tray 48 where it remains until picked up by the operator who determines whether or not the mask is within specification limits and takes action accordingly.

The application makes it possible to scan the entire vertical axis of a mask if such is needed. Recording of such results will greatly assist in process control.

The details of operation of the densitometer, photocell units, and air cylinder s have not been specifically dealt with since they are conventional units used in ways well known in the prior art and as such form no part of this invention other than in the combinations employed in this invention.

The advantages of the present system have not been summarized heretofore and they are as follows:

(1) It is possible to inspect each mask without difficulty since the system is virtually automatic.

(2) The densitometer readings may be displayed for immediate action by the operator and also recorded to indicate trends for process control, (3) One hundred percent inspection will virtually eliminate defective masks being introduced into the production process, and (4) substantial savings in inspection costs.

What we claim is:

1. An aperture mask conveyor and inspection system for feeding the mask to a densitometer to check the amount of light transmission at the center portion of the mask, said system comprising:

(a) a first conveyor means comprising a pair of parallel belt conveyors which grip the mask therebetween, said means for receiving and transporting a vertically disposed aperture mask having one of its axes extending horizontally, said mask traveling in the direction of said axis, (b) chute means positioned beneath the first conveyor means and at right angles to the line of travel of the aperture mask, (c) means for moving one of the pair of belt conveyors away from the other so that the mask normally griped therebetween will fall freely upon the chute means, (d) means for sensing the travel of the mask whereby when said mask is aligned with the chute the conveyor will release the mask so that the mask will move downwardly onto the chute in the direction of the other axis of said mask, (e) second conveyor means positioned at the lower extremity of the chute to transport the mask in the same direction as in the chute, and (f) a densitometer centrally positioned with respect to the width of the second conveyor means whereby the densitometer will scan the middle of the mask along its other axis.

2. The invention as set forth in claim 1 and wherein the chute means comprises three longitudinal sections, the two outer sections being movable relative to the center section to vary the width of the chute in accordance with mask size.

3. The invention as set forth in claim 2 and wherein a rotatable shaft having oppositely threaded portions extending outwardly from the center portion of the said shaft is operatively connected to the two outer sections whereby rotation of said shaft will cause the two outer sections to move uniformly in response to rotation of the shaft.

4. The invention as set forth in claim 1 and wherein the second conveyor means is a belt conveyor arrangement with a central space running lengthwise thereof, said densitometer being vertically aligned with said central space so as to be in alignment with the center portion of the mask carried on said belt conveyor and further wherein the sensing and control means is also aligned with said central space.

5. The invention as set forth in claim 1 and wherein a piston and cylinder combination is provided to move the movable belt conveyor upon receiving a signal from the means for sensing travel of the mask in said first conveyor means.

6. The invention as set forth in claim 1 and wherein sensing and control means are positioned beyond the densitometer for sensing when the mask portion to be scanned is under the densitometer to actuate same and to deactuate the densitometer when said portion of the mask has passed by the densitometer.

7. The invention as set forth in claim 6 and wherein the first conveyor means comprises a pair of parallel belt conveyors which grip the mask therebetween.

8. The invention as set forth in claim 7 and wherein one of the pair of belt conveyors is movable away from the other so that the mask normally gripped therebetween will fall freely upon the chute means.

9. The invention as set forth in claim 7 and wherein the chute means comprises three longitudinal sections, the two outer sections being movable relative to the center section to vary the width of the chute in accordance with mask size.

10. The invention as set forth in claim 9 and wherein the second conveyor means is a belt conveyor arrangement with a central space running lengthwise thereof, said densitometer being vertically aligned with said central space so as to be in alignment with the center portion of the mask carried on said belt conveyor and further wherein the sensing and control means is also aligned with said central space.

11. The invention as set forth in claim 10 and wherein a piston and cylinder combination is provided to move the movable belt conveyor upon receiving a signal from the means for sensing travel of the mask in said first conveyor means.

12. The invention as set forth in claim 11 and wherein a rotatable shaft having oppositely threaded portions extending outwardly from the center portion of the said shaft is operatively connected to the two outer sections whereby rotation of said shaft will cause the two outer sections to move uniformly in response to rotation of the shaft.

* * * * *